(12) United States Patent
Bandini et al.

(10) Patent No.: US 9,338,026 B2
(45) Date of Patent: May 10, 2016

(54) DELAY TECHNIQUE IN E-MAIL FILTERING SYSTEM

(75) Inventors: Jean-Christophe Denis Bandini, Iselles (BE); Daryl Odnert, Los Altos, CA (US)

(73) Assignee: Axway Inc., Phoenix, AZ (US)

( * ) Notice: Subject to any disclaimer, the term of this patent is extended or adjusted under 35 U.S.C. 154(b) by 449 days.

(21) Appl. No.: 12/355,538

(22) Filed: Jan. 16, 2009

(65) Prior Publication Data

US 2009/0157708 A1    Jun. 18, 2009

Related U.S. Application Data

(63) Continuation of application No. 10/915,216, filed on Aug. 9, 2004, now abandoned, which is a continuation of application No. 10/667,488, filed on Sep. 22, 2003, now abandoned.

(51) Int. Cl.
*H04L 29/06* (2006.01)
*H04L 12/58* (2006.01)

(52) U.S. Cl.
CPC .............. *H04L 12/585* (2013.01); *H04L 51/12* (2013.01); *H04L 63/0245* (2013.01); *H04L 63/0263* (2013.01); *H04L 63/145* (2013.01)

(58) Field of Classification Search
CPC ... H04L 63/0227; H04L 63/14; H04L 12/585; H04L 12/5855
USPC ......... 713/152, 154, 166, 156; 726/11, 13, 14
See application file for complete search history.

(56) References Cited

U.S. PATENT DOCUMENTS

| | | |
|---|---|---|
| 5,278,984 A | 1/1994 | Batchelor |
| 5,283,856 A | 2/1994 | Gross et al. |
| 5,331,543 A | 7/1994 | Yajima et al. |
| 5,369,707 A | 11/1994 | Follendore, III |
| 5,377,354 A | 12/1994 | Scannell et al. |
| 5,414,833 A | 5/1995 | Hershey et al. |
| 5,416,842 A | 5/1995 | Aziz |

(Continued)

FOREIGN PATENT DOCUMENTS

| | | |
|---|---|---|
| EP | 0 420 779 | 3/1991 |
| EP | 0 680 187 | 11/1995 |

(Continued)

OTHER PUBLICATIONS

Andrew Conroy-Murray; "Email Security at the Gateway", Customer Manager Insight Magazine, Think Services, pub. Jun. 4, 2003, p. 10.*

(Continued)

*Primary Examiner* — Eleni Shiferaw
*Assistant Examiner* — Paul Callahan
(74) *Attorney, Agent, or Firm* — Haynes and Boone, LLP (57) ABSTRACT

A relay provides message filtering services to an e-mail network. The relay monitors incoming communication and intercepts e-mail messages. The relay applies a policy to received messages to determine whether a message should be delayed. The relay applies a policy to delayed messages by reference to a delayed processing event which triggers the delayed processing. The relay updates policy data in accordance by employing an update module. The relay then restricts the delivery of messages having attributes close to those of harmful data as provided by a policy database.

20 Claims, 4 Drawing Sheets

(56) References Cited

U.S. PATENT DOCUMENTS

| | | | |
|---|---|---|---|
| 5,530,758 | A | 6/1996 | Marino et al. |
| 5,555,346 | A | 9/1996 | Gross et al. |
| 5,577,202 | A | 11/1996 | Padgett |
| 5,606,668 | A | 2/1997 | Shwed |
| 5,619,648 | A | 4/1997 | Canale et al. |
| 5,623,600 | A | 4/1997 | Ji et al. |
| 5,627,764 | A | 5/1997 | Schutzman et al. |
| 5,632,011 | A | 5/1997 | Landfield et al. |
| 5,748,884 | A | 5/1998 | Royce et al. |
| 5,778,174 | A | 7/1998 | Cain |
| 5,802,253 | A | 9/1998 | Gross et al. |
| 5,828,893 | A | 10/1998 | Wied et al. |
| 5,835,726 | A | 11/1998 | Shwed |
| 5,864,683 | A | 1/1999 | Boebert et al. |
| 5,889,943 | A | 3/1999 | Ji et al. |
| 5,905,777 | A | 5/1999 | Foladare et al. |
| 5,978,484 | A | 11/1999 | Apperson |
| 5,983,270 | A * | 11/1999 | Abraham et al. ............ 709/224 |
| 6,072,942 | A | 6/2000 | Stockwell et al. |
| 6,154,840 | A | 11/2000 | Pebley et al. |
| 6,182,118 | B1 | 1/2001 | Finney et al. |
| 6,237,096 | B1 | 5/2001 | Bisbee et al. |
| 6,324,648 | B1 | 11/2001 | Grantges, Jr. |
| 6,385,655 | B1 | 5/2002 | Smith et al. |
| 6,393,568 | B1 | 5/2002 | Ranger et al. |
| 6,424,718 | B1 | 7/2002 | Holloway |
| 6,609,196 | B1 | 8/2003 | Dickinson et al. |
| 6,651,166 | B1 | 11/2003 | Smith et al. |
| 6,708,203 | B1 * | 3/2004 | Makar et al. ................. 709/206 |
| 6,772,196 | B1 * | 8/2004 | Kirsch et al. ................. 709/206 |
| 6,853,988 | B1 | 2/2005 | Dickinson et al. |
| 6,996,530 | B2 * | 2/2006 | Shizuka et al. ............... 704/260 |
| 7,117,358 | B2 | 10/2006 | Bandini et al. |
| 7,127,741 | B2 | 10/2006 | Bandini et al. |
| 7,162,738 | B2 | 1/2007 | Dickinson, III et al. |
| 7,219,148 | B2 * | 5/2007 | Rounthwaite et al. ........ 709/224 |
| 7,287,060 | B1 * | 10/2007 | McCown et al. ............. 709/206 |
| 7,380,274 | B2 | 5/2008 | Dickinson, III et al. |
| 7,389,413 | B2 | 6/2008 | Bandini et al. |
| 7,401,356 | B2 | 7/2008 | Bandini et al. |
| 7,543,053 | B2 * | 6/2009 | Goodman et al. ............ 709/224 |
| 2002/0199095 | A1 * | 12/2002 | Bandini ................ H04L 12/585 713/151 |
| 2003/0196098 | A1 | 10/2003 | Dickinson, III et al. |
| 2004/0030788 | A1 * | 2/2004 | Cimo et al. ................... 709/229 |
| 2004/0039786 | A1 * | 2/2004 | Horvitz ................ G05B 19/404 709/207 |
| 2004/0117648 | A1 * | 6/2004 | Kissel ........................... 713/200 |
| 2004/0193922 | A1 | 9/2004 | Bandini et al. |
| 2005/0081059 | A1 | 4/2005 | Bandini et al. |
| 2007/0005983 | A1 | 1/2007 | Dickinson, III et al. |
| 2008/0250503 | A1 | 10/2008 | Bandini et al. |

FOREIGN PATENT DOCUMENTS

| | | |
|---|---|---|
| GB | 2318486 | 4/1998 |
| GB | 2318846 | 5/1998 |
| JP | 3-117940 A | 5/1991 |
| JP | 5-207029 A | 8/1993 |
| JP | 6-276221 A | 9/1994 |
| JP | 7-107082 A | 4/1995 |
| JP | 8-204701 A | 8/1996 |
| JP | 8-251156 A | 9/1996 |
| JP | 8-263404 A | 10/1996 |
| JP | 9-252294 A | 9/1997 |
| JP | 10-504168 | 4/1998 |
| JP | 2000-515332 | 11/2000 |
| JP | 2001-505371 | 4/2001 |
| WO | WO 96/35994 | 11/1996 |
| WO | WO 97/00471 | 1/1997 |
| WO | WO 97/24825 | 7/1997 |
| WO | WO 99/05814 | 2/1999 |

OTHER PUBLICATIONS

Author unknown, $3^{rd}$ party search of internet archive (2 pages) and printouts (31 pages), apparently representing content archived from http://www.nha.com circa Nov. 12, 1996. Printouts include pages apparently descriptive of a MIMEsweeper (documents apparently received from $3^{rd}$ Party and apparently printed Jun. 8, 2004), 33 pages.

Cate, Vincent, "Email-Firewalls"/Instant Corporate PGP, May 21, 1994, pp. 1-2.

Cheswick, W.R. and Bellovin, S.M., "Firewalls and Internet Security-Repelling the Wily Hacker," Addison Wesley 1st ed., 1994.

Brondmo, H.P., Olson, M., et al. "A Solutions Blueprint for Solving the Span Problem by Establishing Volume Email Sender Accountability, White Paper issued by the Network Adertising Intiative Email Service Provider Coalition", Sep. 24, 2003.

Department of the Army, U.S. Army Corps of Engineers, Emergency Employment of Army and Other Resources, "Emergency Operations Center Standard Operating Procedures (HQUSACE-EOCSPO)," OM 500-1-6, Appendix C, Jul. 12, 1994.

Integralis Asia Pacific, "Total Email Content Management Countering Email Borne Threats," White Paper MIMIsweeper, Jan. 1996, pp. 1-12.

Kohno, Masaru.

Levien, Ralph, "Protecting Internet E-Mail from Prying Eyes," Data Communications, May 1996, pp. 117-126.

Matunaga, Yasuhiko and Sebayashi, Katsuhiro, "Adaptive Route Filtering for the Stable Internet Routing," NTT Multimedia Networks Laboratories, Tokyo, Technical Report of IEICE SSSE 97-5, Apr. 1997.

Net PC, vol. 2, No. 2, Feb. 1997, pp. 158-163.

Nikkei Open Systems, No. 52, Jul. 1997, p. 316-346.

Pollock, Stephen, "A Rule-Based Message Filtering System," ACM Transactions on Office Information Systems, vol. 6, No. 3, Jul. 1, 1998, pp. 232-254.

Press Release, Integralis Announces MIMEsweeper Compatible with Check Point FireWall-1 on Single NT Server, Sep. 16, 1996 (document apparently printed Sep. 30, 2003), 2 pages.

S. Kent Privacy Enhancement for Internet Electronic Mail: Part II: Certificate-Based Key Management, Network Working Group, Request for Comments 1422, Feb. 1993, pp. 1-33.

Press Release, Integralis releases MIMEsweeper Version 2.0 with SMTP mail security support, Jan. 15, 1996 (document apparently received from 3rd Party and apparently printed Jun. 8, 2004), 2 pages.

Press Release, Integralis announces version 2.3 of MIMEsweeper with new email security features, Jun. 13, 1996 (document apparently received from 3rd Party and apparently printed Jun. 8, 2004), 2 pages.

Schneider, Bruce, "Applied Cryptography," $2^{nd}$ Ed., Oct. 1995, John Wiley & Sons, pp. 31-33 and 185-187.

Serinelli, Bob & Leisher, Tim, "Securing Electronic Mail Systems,"Milcom 92, 677-680, 1992.

Smith, Richard E., "Constructing a High Assurance Mail Guard," Secure Computing, San Jose, CA, 1994.

Smith, Randall E., "A Secure Email Gateway, Computer Security Applications," 11th Annual Conference, 202-211, 1994.

Costales, Bryan and Allman, Eric, "Help for UNIX System Administrators," Sendmail, $2^{nd}$ Edition, O'Reilly & Associates (1997), Ch. 20, pp. 285-302 (received from $3^{rd}$ party).

Costales, Bryan and Allman, Eric, "Building, Installing, and Administering Sendmail," Sendmail, $3^{rd}$ Edition, O'Reilly & Associates (2002), Appendix D, pp. 1161-1172 (received from $3^{rd}$ party).

* cited by examiner

DELAY TECHNIQUE IN E-MAIL FILTERING SYSTEM

CROSS-REFERENCE TO RELATED APPLICATION(S)

This application is a continuation of U.S. application Ser. No. 10/915,216, filed Aug. 9, 2004, which is itself a continuation of U.S. application Ser. No. 10/667,488, filed Sep. 22, 2003, now abandoned.

BACKGROUND

1. Field of the Invention

The present invention relates to communication systems, and more particularly to electronic message delivery.

2. Description of the Related Art

Receiving unwanted electronic messages, such as e-mail messages, wastes time and valuable resources. Electronic message communication has become a prevalent, and perhaps preferred, method of communication in today's world. Such communication is apparent in most aspects of daily life including workplace, home, and travel. At the workplace, the messages may arrive from clients, partners, customers, or other employees. Additionally, unwanted messages commonly known as "SPAM" are received by users. The circumstances are similar for the home user where both wanted and unwanted SPAM messages are received. Reviewing the SPAM messages consumes time, which may be highly valuable in the case of workplace time, and may also undermine the user's capacity to receive other, desirable, messages. In addition, when the flow of unwanted messages is large, it also impact the computer infrastructure (bandwidth, storage, CPU). Additionally, the email infrastructure has become a very common way to spread viruses and the trend has been that some of the most recent viruses spread very rapidly and there is often a window of time of several hours during which anti-virus products are not capable of detecting a new virus yet. Accordingly, there is a need for a method for controlling and reducing the number of harmful data, such as SPAM messages or virus-carrying messages, received by users associated with a store and forward protocol relay.

SUMMARY

Accordingly, the present invention provides a store and forward relay that delays the delivery of data to user stations or the next relay in the transmission path. The delivery delay is triggered by reference to a delay policy of the store and forward relay. The delayed data packages are maintained in a quarantine storage area until a policy is applied to the data packages. The application of the policy to the delayed data packages is determined by reference to a delay processing module. A data package may be returned to the quarantine area after application of the policy. The delaying and applying a policy to the package may be repeated several times until either the data package is properly characterized or it is determined that further delaying the data package is not acceptable.

In one embodiment, the invention provides a method for controlling transmission of messages in a data communication network where each message is associated with a message source. The method includes providing a store and forward relay, which is associated with a plurality of recipients receiving messages. The relay receives a message intended for a recipient associated with the e-mail network. the relay applies a first filtering policy to the message. The relay then delays the delivery of the message in response to at least one predetermined result of applying the first filtering policy. The relay applies a second filtering policy to the message after a delay period. Finally, the relay delivers the message in response to at least one predetermined result of applying the second filtering policy.

BRIEF DESCRIPTION OF THE DRAWINGS

FIG. 3 illustrates a method for applying a SPAM policy in the method illustrated in FIG. 2; and FIG. 4 illustrates a method updating policy date relating to SPAM messages to form the SPAM policy database of FIG. 1.

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The present invention is discussed by reference to figures illustrating the structure and operation of an exemplary system. First, the logical structure of a network arrangement according to the invention is described. The general operation of a store and forward relay of the invention is illustrated by reference to a flow diagram. Next, the operation of the e-mail relay of the network arrangement is discussed by reference to flow diagrams. Finally, the specific operation of the e-mail relay in comparing and collecting known SPAM messages is discussed by reference to corresponding flow diagrams.

In one embodiment, the invention is applicable to an e-mail relay that stores and forwards e-mail messages to users associated with an enterprise. The e-mail relay has a SPAM filter policy that is applied to incoming messages. Messages that are not deemed clearly SPAM or clearly clean are delayed and placed in a detention area. The SPAM filter policy is periodically updated with data or code which enhances its ability to detect SPAM messages, which may arrive at the enterprise. The delayed messages are processed by the SPAM filter policy at a later time so as to conclusively identify the nature of the message. This process may repeat several times until a message character is clearly identified to the satisfaction of the e-mail relay, as configured by an administrator. Alternatively, the administrator may set a maximum amount of time in the quarantine area, after which time the message is again processed by SPAM filter policy. Alternatively the administrator may set time windows relative to the time of the day which affect the maximum delay of a messages: for instance a 6 hours delay may be acceptable at night but only a 1 hour delay during business hours. As may be appreciated, the delaying of processing questionable messages allows the e-mail relay to more accurately characterize the message, especially when sharing SPAM filter data with other e-mail relays of a similar nature. In yet another embodiment, the delay may allow for the downloading of updated data used by the SPAM filter policy or by the virus filter policy.

The present invention is particularly suitable for application to a store and forward type protocol since such protocol includes a provision for delays along the delivery path. Hence, there is already an expectation of some delay in the delivery of data from the sender to any potential recipient. Accordingly, a system in accordance with the invention takes advantage of the expectation for delay to enhance its ability to detect harmful data attacks which are delivered over the store and forward protocol. Examples of such protocols are protocols used for email delivery. The most pervasive and common is the SMTP protocol, which is broadly used on the internet.

With a store and forward protocol, such as the above mentioned SMTP protocol, a delivery is moved from its origin to its destination by going through one or more intermediate nodes. In the case of email deliveries, the network nodes associated with receiving a data package and passing it to another intermediate node or to the final destination are often referred to as "email relays" or "mail transfer agents" (MTAs). These nodes are logical entities on the network, which in reality may comprise a single computer or a set of several computers acting logically as a single store-and-forward node. Some of the nodes may act as the final node in addition to acting as an intermediate node when the node further includes the ability to deliver incoming messages to a set of users that are associated with the node. This delivery can be accomplished by several methods. For example, in a Unix system, the MTA simply stores the messages in a mail folder corresponding the recipient user. In other systems, the MTA stores the messages in a special storage area and makes the messages available to recipient users by employing an access service, such as that provided by the Post Office Protocol ("POP") or by the Internet Message Access Protocol ("IMAP"). Other systems, such as a MICROSOFT EXCHANGE server, may use proprietary methods to make the incoming messages available to the recipient users. The present invention is applicable to all MTAs regardless of whether they are configured as a final node or an intermediate node since the pure relaying functions are logically separate from the final step of delivering incoming messages to recipient users.

The intermediate nodes, MTA in the case of email, are preferably part of a network which may be private, semi private, public, or a mixed. A particular and important case is of the Internet. In the context of the Internet, the MTAs may be located at Internet Services Providers (ISP), at the edge of enterprises, or inside enterprises. The present invention is particularly effective when the MTA operating in accordance with the invention is located at the edge between the internet and a private network.

To facilitate control and security functions, MTAs are configured to implement routines that control traffic beyond the minimal requirements of the supported protocol. This MTA functionality can be described as a set of one or more actions associated with one or more conditions in the form of <condition(s), associated action(s)>, <condition(s), associated action(s)>, and so forth. This abstraction is sometimes referred to as a set of "filter policies". It should be appreciated that the term "filter" in this context is not limit to actions of blocking messages but is also applicable to annotation actions such as tagging a message with an identifier. Different implementations may have different representations of these policies and different levels of flexibility in term of the conditions and actions available to the policies and how policies interrelate. While the present application refers to an application of a "policy," the applicable functionality is also referred to as a "configuration," "rules," "triggers," and "filters."

One example of an MTA that imposes a policy to control message delivery to user accounts is an email relay capable of being positioned to intercept and process messages flowing into an email network. Such an email relay is described in U.S. Pat. No. 6,609,196. As an example, the system described in U.S. Pat. No. 6,609,196 can be effectively used to control the flow of SPAM messages by applying policies adapted to detect that a message is indeed SPAM. The e-mail relay is further configured to update the policies it applies to messages, for example when a new virus is discovered. These updates provide enhanced message processing capabilities, especially with SPAM detection, where attributes associated with SPAM messages are consistent for a large group of messages, transmitted to multiple recipients. However, it has been observed that often times the policy updates are too late, arriving subsequent to the e-mail relay already receiving the subject SPAM messages. Hence, the present invention provides a configuration and method for increasing the effectiveness of updates by introducing a delay processing policy which can be implemented by such an e-mail relay. The ability to more accurately identify harmful data packages is possible by combining the policy engine with an update service which provides policy data to the policy engine, e.g., recent information about email threats for a e-mail relay. In some embodiments, the update service may also provide code modules in addition to data to update the policy engine.

The update service is preferably facilitated by operation of an update module, which may already be provided by the MTA for the purpose of updating policy data. The update module advantageously receives either program data or executable code updates from a related or a third party. For example, a virus policy application of the MTA typically receives updates relating to new virus threats. Updates are also already part of some anti-SPAM policy MTAs, which receive updates as to the form of detected SPAM messages.

The update module updates relevant policy data or code, which is employed by the MTA to identify harmful messages. The form and timing of such updating is preferably determined by reference to the particular policy enforcement and organization associated with the MTA. Some of the relevant configuration options include deciding which party is authorized to modify policies (administrator or user) and what will be the scope of policies (global to the MTA or associated with a specific group of users).

The structure of a network, which is suitable for employing the teaching of the present invention, will now be discussed with reference to FIG. 1. Although the discussion refers to an email relay for filtering email messages, the discussion is applicable to general MTAs implementing some kind of policy with respect to received data. The discussion below refers to the protected network resources as part of an enterprise; however, protected resources of the invention additionally include other types of organizations and network resources such as Internet service providers and corresponding subscribers as well as an Internet webmail site servicing user accounts.

Figure 1:
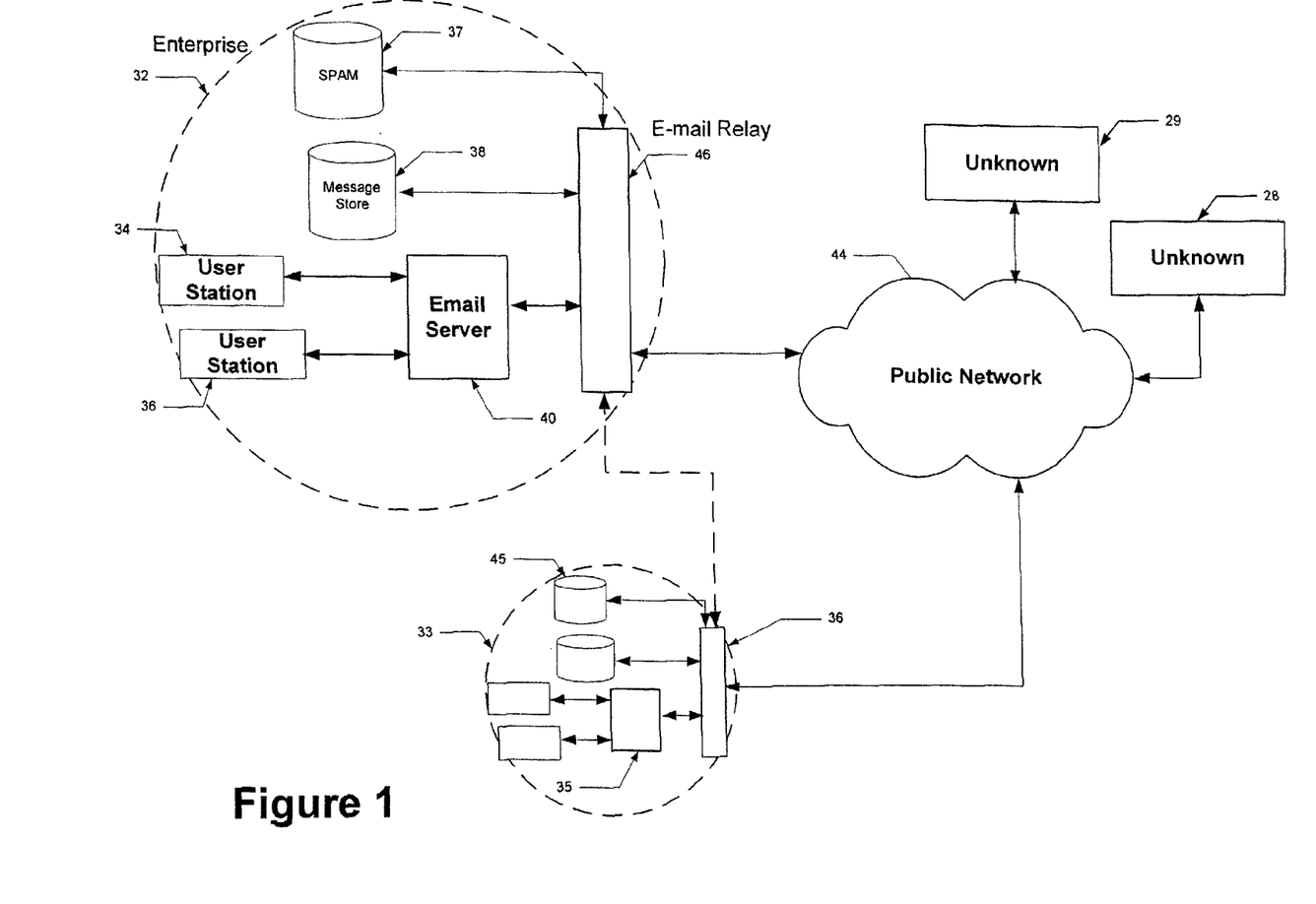
FIG. 1 illustrates a network arrangement, which includes a e-mail relay, in accordance with the invention.

The illustrated network arrangement of FIG. 1 includes user stations 34, 36, an e-mail server 40, a public network 44, and an email relay 46 of the invention. The user stations 34, 36, and the e-mail server 40 are coupled together by a network such as a Local Area Network (LAN). The network is used to internally couple enterprise resources in a generally trusted manner since the network is preferably separated from the external, or public, network 44 by an access firewall (not shown). The access firewall is discussed only for purposes of explanation and is not required for operation of embodiments employing the principles of the present invention. The public network 44 is preferably a Wide Area Network (WAN) such as the Internet. The public network 44 facilitates communication of e-mail messages to the local network.

The e-mail relay 46 is preferably interposed behind the common access firewall, on the "safe side" of the access firewall. The e-mail relay 46 advantageously takes a form as described in further detail herein to filter e-mail messages received from outside the protected enterprise. Preferably, the e-mail relay 46 takes the form of a program executing on a conventional general purpose computer. In one embodiment, the computer executes the Windows NT or Windows 2000 operating systems available from Microsoft Corp., of Redmond, Wash. In other embodiments, the computer executes a Unix operating system such as Solaris from Sun Microsystems, of Mountain View, Calif. In some embodiments, the e-mail relay 46 includes processes and data distributed across several computer systems, which are logically operating as a single e-mail relay in accordance with the invention. Although the e-mail relay 46 is shown as operating on e-mail messages between an internal site and an external site, the e-mail relay 46 may also be used to filter e-mail messages between two internal sites. Furthermore, the e-mail relay 46 can be used to filter outgoing messages, such as those, for example, from a hacker employing the enterprise resources to transmit SPAM messages. In other embodiments, the enterprise may have several instances of e-mail relay 46 for redundancy or geographic distribution.

The email relay 46 is coupled to one or more e-mail server 40 associated with the enterprise 32. The e-mail server 40 preferably facilitates processing of e-mail messages by local user stations 34, 36. In one embodiment, the e-mail server 40 is configured as a Simple Mail Transfer Protocol (SMTP) server. As may be appreciated, the e-mail server 40 is only one of the resources provided by the enterprise 32. The enterprise 32 usually includes various resources to facilitate communication, administration, and other business tasks. In other embodiments, e-mail relay 46 is associated with at least one intermediate internal email relay.

The e-mail relay 46 has available a SPAM policy database 37 and a message store database 38, which is typically used to store e-mail messages while in transit. As is known, the e-mail relay 46 is associated with other data storage modules (not shown) for facilitating proper operation of various aspects of the e-mail relay. In other embodiments, the e-mail relay 46 includes an anti virus policy database (not shown).

A second e-mail relay 36 is coupled to the public network 44. The second e-mail relay 36 is associated with a second enterprise 33, including a local e-mail server 35. The structure and operation of the second e-mail relay 36 and the second local network are preferably similar to that of corresponding elements in the first local network.

Unknown sender systems 28, 29 are coupled to the public network 44 to transmit e-mail messages to recipients associated with the enterprise 32. Such systems are preferably computer systems associated with each such respective entity. As may be appreciated, some of the systems 28, 29 are composed of various combinations of resources and configuration different from those employed in the illustrated enterprise 32, as is known in the art. Furthermore, the systems 28, 29 may employ various protocols to communicate with respective local stations.

The user stations 34, 36 are preferably user terminals, which are configured to facilitate business processes related to the enterprise's operation. In one embodiment, the user stations 34, 36 are computer systems at employee offices. The user stations 34, 36 are preferably coupled to the e-mail server 40 over the local area network to access e-mail applications. In other embodiments, the user stations 34, 36 are facilitated by Personal Data Assistant (PDA) devices or mobile telephone units employing a wireless connection to the email server 40.

The e-mail server 40 facilitates the transmission of e-mail messages between user stations 34, 36 and external systems. E-mail messages intended for recipients within the enterprise are processed by the e-mail server 40 and are forwarded to the recipients by way of the local network. E-mail messages intended for recipients outside the enterprise are processed by the e-mail server 40 and are transmitted over a communication link between the e-mail server and the public network 44. The public network 44 proceeds by facilitating delivery of the messages to the various intended recipients.

The e-mail relay 46 operates to filter incoming e-mail messages so as to reduce the number of SPAM messages received by the enterprise 32. In operation, local users are the target of communication from various entities coupled to the public network 44. In one embodiment, at least part of such communication is intercepted by the e-mail relay 46. For example, an outside sender of an e-mail message composes a message and transmits the message over the public network 44 to the enterprise. The email relay 46 intercepts the e-mail message instead of allowing it to proceed to the e-mail server 40, as is known in the art of store and forward protocol, such as SMTP. The e-mail relay 46 determines whether to reject, accept, or delay forwarding the message to the e-mail server 40 after some inspection. In another embodiment, the policy manager combines the evaluations using a statistical or probabilistic formula or a Bayesian statistical analysis to determine the action to take.

The delay processing action, which causes the email relay to defer processing of an email message depends on a combination of policy conditions associated with the email relay. One conditions which may affect the decision to defer inspection of an email message, or any data package in general, is the time of reception, e.g., whether the message is received out of business hours when there is no drawback in deferring delivery until the next business day. Another condition relates to the likelihood that the message is SPAM, when the likelihood that a message is SPAM is moderate (as discussed below), the message is delayed for future processing instead of automatically discarded, in the case of a zealous policy. Another important condition relates to the likelihood that the message is a virus such as, for example, by detecting the presence of suspicious executable attachments.

As discussed above, the messages put in the detention area for delayed processing are examined again by the policy manager sometime after the previous examination. The event which triggers the subsequent examination is determined by reference to the particular data packages that are the subject of the policy as well as the nature of the protected users. One example event, which triggers the subsequent examination is the fact that the update service has downloaded new data or code to update the policy applied by the MTA. Another example event is that the message has been detained for a predetermined time or that the current time has passed a threshold (such as the start of business day).

Preferably, the actions taken by the policy manager illustrated in FIG. 1 include deliver normally, return to sender, copy to one or more new recipient, blind copy to one or more new recipient, forward to one or more new recipients, delete, delay delivery and store in an area for future review by an administrator, delay delivery and store in an area for future review by an external user, delay delivery and store in an area for future review by one or more of the recipient, save a copy, or store in the detention area.

An example method used to determine which action is applicable to a message in the illustrated email relay is discussed further below. If the determination is to accept the message, the e-mail server 40 refers to the destination field of the message to identify the local recipient. The message is then transmitted to a user station associated with the local recipient. In another embodiment, the e-mail server 40 transmits the message to the user station only after the user requests the message. For example, e-mail servers executing the Post Office Protocol version 3 (POP3) or IMAP operate in this manner when receiving messages for associated users.

Figure 2A:
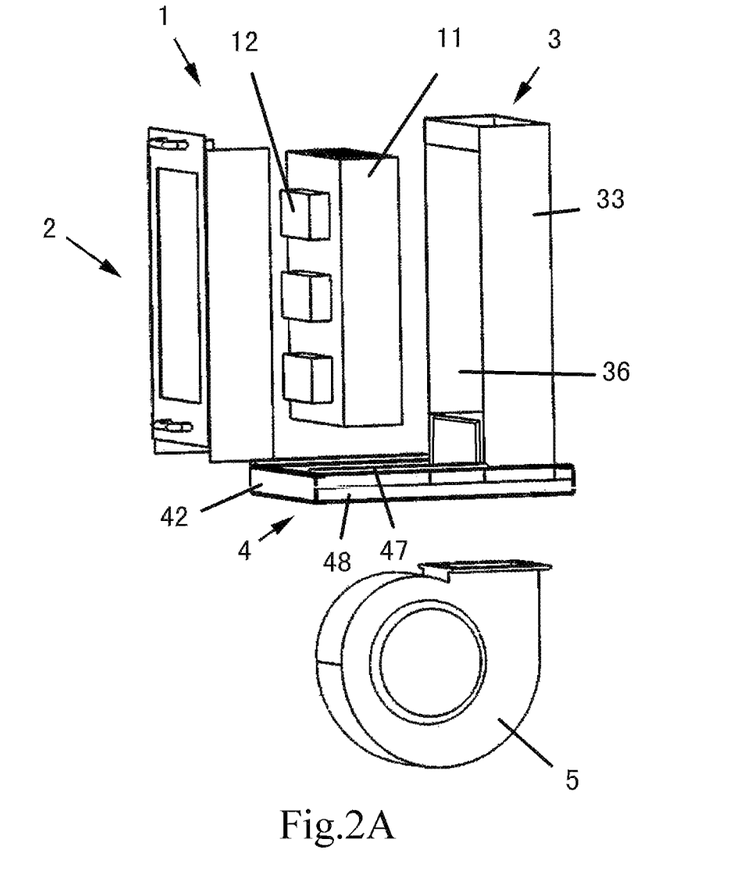
FIG. 2 is a flow diagram illustrating the general operation of a store and forward relay of the invention.
Figure 2B:
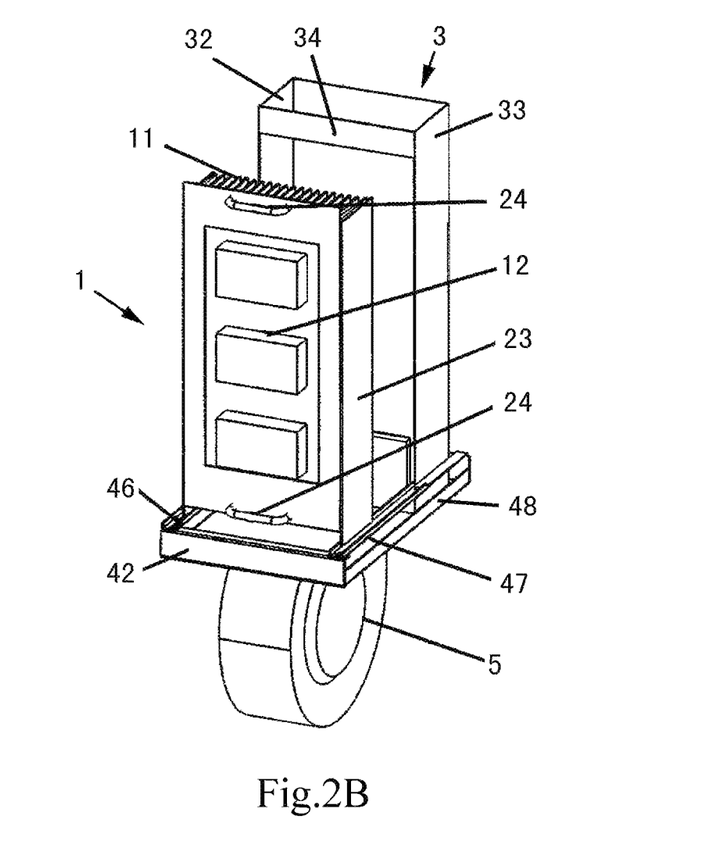
Figure 2C:
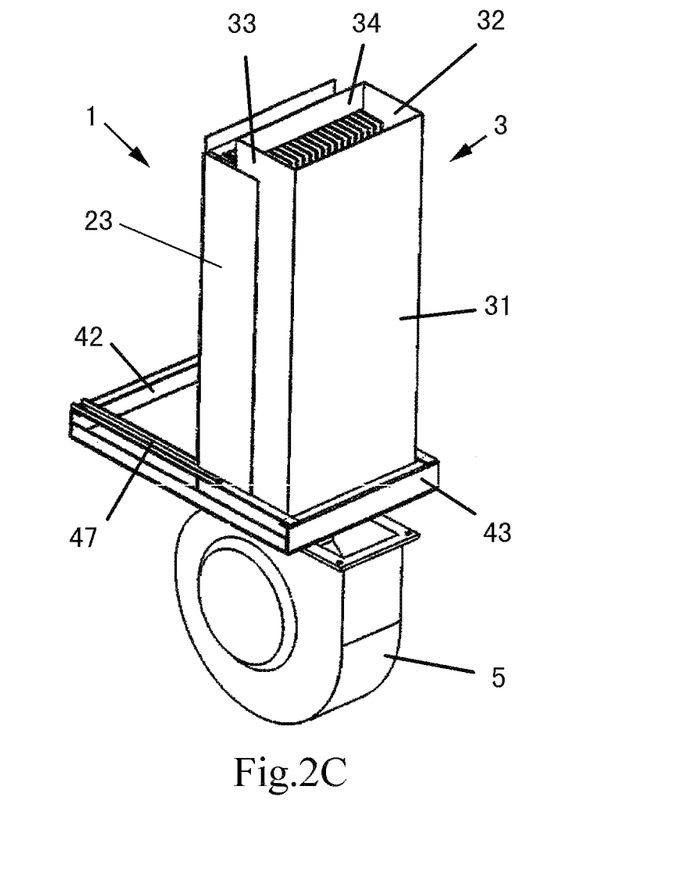

FIG. 2 illustrates a method employed by an e-mail relay 46 employing automatic delay processing for all incoming messages which is operating as part of the network arrangement of FIG. 1. The e-mail relay 46 is generally adapted to filter e-mail received into the enterprise 32 by applying at least one policy to incoming messages. Particularly, the e-mail relay 46 compares attributes of received e-mail messages to attributes typical to SPAM messages. The attributes are employed by the policy to determine whether an e-mail message should be allowed to flow to the e-mail server 40 or should be diverted and subject to other action. Some of those actions, which the e-mail relay 46 is adapted to execute, include: quarantine the e-mail in the local message store database 38 for delayed processing, reject the e-mail, and generate a special message to the intended recipient indicating that the e-mail message has been diverted. However, as discussed above, it is advantageous to delay the processing of messages so as to reap the benefits of an updated policy, or hindsight. An example method for updating a SPAM database 37 is discussed below with reference to FIG. 4.

Accordingly, the e-mail relay 46 operates to receive an e-mail message (step 52). In one embodiment, the e-mail relay extracts attribute data from the message, which is used to generate a comparison between the intercepted e-mail and e-mail message policy data in the SPAM policy database 37 to determine whether the message should be rejected, accepted, or delayed. In the illustrated embodiment, the delay processing is applicable to all received messages.

Accordingly, the e-mail relay delays delivery and stores the message in a detention storage area (step 54). The e-mail relay determines whether it is time to process the message in the detention area (Step 56). If it is not time to process the message, the e-mail relay returns to the wait state (step 56). If it is time to process the message, the e-mail relay compares the message attributes with attribute data from the SPAM policy database (Step 58). The determination of when to process messages from the detention area is preferably by reference to a delay processing module that monitors events relevant to the determination. If the message comparison (discussed below) provides a clean message determination, the e-mail relay allows the message to proceed to the intended recipient or recipients (Step 59). If the message is determined to be harmful, such as a SPAM message, the e-mail relay blocks delivery and adds the message attributes to the policy database (Step 60). In an alternate embodiment, the e-mail relay allows a message to proceed along a communication path to the recipient, despite a characterization of the message as harmful or possibly harmful, while adding a special tag to the message so as to share the characterization with a downstream component which controls message delivery. In yet another embodiment, the e-mail relay stores the message is a quarantine area, which is accessible by the recipient for reviewing the message content. In this embodiment, the e-mail relay preferably notifies the recipient of such action, indicating that an intended message has been moved to a quarantine area.

In one example embodiment, the e-mail relay compares incoming messages to policy data to arrive at a comparison score. In one embodiment, the comparison score can provide one of three indications: SPAM, clean, and delay processing. The three results are provided by setting a threshold range for the comparison score. The range is preferably defined by two levels. The first level is a borderline threshold level and the second level is a SPAM threshold level, which is preferably higher than the borderline threshold level. In one embodiment, the two threshold levels are configurable by an administrator so as to allow for adjusting SPAM filtering sensitivity. When the comparison score is beyond the SPAM threshold level, the result is a SPAM indication, i.e., the e-mail is likely a SPAM message. SPAM messages are preferably blocked and attributes are extracted so as to update data in the SPAM policy database 37 (step 60).

In one embodiment, this extracted attribute data is shared with other e-mail relays or with a third party service. When the comparison is below the borderline threshold level, the result is a clean indication, i.e., the e-mail is likely not a SPAM message. Clean messages are preferably allowed to proceed to the recipient or recipients (step 58). Finally, when the comparison score is within the threshold range (higher than the borderline threshold level but lower than the SPAM threshold level), the result is a delay processing, i.e., a later evaluation is required to determine whether the e-mail is a SPAM message. Delay processing messages are preferably quarantined in the Message Store database 38 and are subject to subsequent examination in accordance with a schedule provided by a delay processing manager module (Step 54). In another embodiment, the examination of the message further includes inquiring whether the message is likely to contain malicious code or virus.

FIG. 3 illustrates an exemplary method for comparing incoming e-mail attributes to attributes from SPAM policy database 37 in an e-mail relay that is filtering e-mail messages. The e-mail relay 46 selects a comparison formula to apply to the intercepted message (step 62). In one embodiment, the comparison is selected based on predetermined attributes of intercepted messages such as sender organization, recipient group, and attachment type. The comparison is preferably based on a set of evaluations, as discussed with further detail below.

The intercepted message attribute data relevant to the first evaluation in the comparison is extracted (step 64). The attribute data is examined in accordance with the evaluation (step 66). The evaluation result is added to a running comparison score according to the relative weight of the evaluation (step 68). The email relay 46 determines whether the comparison score has already exceeded the SPAM threshold level (step 70). If the comparison score has already exceeded the SPAM threshold level, the comparison operation reports the message as SPAM. (step 72). If the comparison score has not exceeded the SPAM threshold level, the e-mail relay 46 determines whether the evaluation is the last one in the comparison formula (step 74). If there are other evaluations in the formula, the message attribute data for the next evaluation in the comparison are extracted (step 80), and the method proceeds to a corresponding comparison (step 66). If the evaluation is the last evaluation, the e-mail relay 46 determines whether the score is below the borderline threshold level (step 76). If the comparison score is below the borderline threshold level, the message is reported as clean (step 78). If the comparison score is not below the borderline threshold level, the message is reported as delay processing (step 82).

The database 37 used to store SPAM policy data is organized so as to facilitate an efficient processing of incoming messages. In one embodiment, the database 37 is a relational database such as an Oracle or SQL server. A relational database allows for efficient retrieval of information by employing appropriate indexing, as is known in the art. In one embodiment, each record in the database corresponds to a known SPAM attribute data. The attribute data is preferably stored as a Character Large Object or as a Binary Large Object in the record, as in known in the art.

Attributed data derived from processing a message identified as SPAM is stored in the database 37. In one embodiment, a hash computation result based on the message body, or portions of the message body, is stored in the database 37 as an attribute of a known SPAM message. The hash result is provided by employing known techniques for generating a hash value from a text collection. This hash value is used by the e-mail relay 46 to quickly determine a match likelihood between a received message body text and a known SPAM has attribute value. Other attributes derived from the SPAM messages include URLs found in the message body. These URLs can be stored in a URL table for efficient retrieval and updating. Finally, in one embodiment, a sorted list of e-mail recipients derived from SPAM messages is used to provide for an efficient way of determining when an incoming message includes the same recipient list attribute as a SPAM message. In another embodiment, SPAM message body text is stored in a database of a Full Text Retrieval System to facilitate efficient searching of textual content in the SPAM message body. In another embodiment, the message body text is matched against a list of regular expressions which describe phrases or words characteristic to SPAM messages.

The delayed processing method of the invention is preferably implemented by the e-mail relay 46 acting as an intermediate or final node for a store and forward email protocol, sometimes referred to as a Mail Transfer Agent (MTA) in the art. As discussed above, a policy manager is associated with the e-mail relay 46 to apply one or more processing actions on e-mail messages, both incoming and previously detained messages, based on one or more conditions. The e-mail relay preferably includes an update service module, which is adapted to update the data or code in the SPAM policy database 37, in accordance with the method of FIG. 4. As is shown in FIG. 4, in one embodiment, this updated data or code is provided from an external third party. In another embodiment, the updated data or code is provided from an internal program associated with the same enterprise as the e-mail relay. In some embodiments, the e-mail relay further includes a delay processing manager module which is adapted to initiate policy manager processing of a previously developed e-mail message by reference to temporal or event driven variables.

The policy manager makes processing decisions based on an attribute set that is selected so as to most effectively detect SPAM e-mail messages, as applicable to the protected enterprise. In some embodiments, the policy manager refers to the email sender, such as by querying a local or remote sender directory. In other embodiments, the policy manager refers to the email recipient, such as by querying a local or remote recipient directory. In yet other embodiments, the policy manager refers to the email headers, including the subject. Other attributes of the e-mail message that the policy manager refers to include textual content in the email body (including the presence of keywords or regular expressions), email file size, format of the email body (including the presence of an HTML format), HTML construct (if HTML format is present), URL in the email body and/or attachments, the number, size, type, and name of an attachment, the textual or binary content of an attachment, presence and validity of a digital signature on the email or attachments, whether the email follows the standard format, hash of a portion or entire email and comparison of the hash against a database, presence of virus or malicious code in the email, time of day, day of week, and other calendar information, whether the email has been previously delayed, time e-mail has been delayed, if the email has been delayed, the IP or domain of the sending MTA queried to a local or remote database, the transport protocol session (such as envelope sender and recipient). In another embodiment, the message and its attachments are examined to detect binary pattern characteristic of malicious code or virus.

In another embodiment, the condition and action association may be different for some or all of the recipients. The action are taken in combination with modifying some aspects of the email including but not limited to subject, headers, body and/or attachments. The modification may be done on copies of the email in case the policy manager configuration requires different modifications for different users. In one embodiment, the modification of the email consists of removing virus or malicious code that may be present in the email and/or attachments. The association between condition and action is configurable by an administrator. The association between condition and action may be dependent on, and configurable by, the recipient of the email.

The update service download policy data or code updates are preferably from one or more servers based on timing intervals, automatic notifications by a third party, or a manual request by an administrator. The download operation is preferably under FTP or HTTP protocols. The detention area manager makes the decision to resubmit an email in the detention area to the policy manager based on one or more conditions, including time since in detention, time in detention as a function of the current time, the fact that the policy manager has been updated since the email was put in detention area, or current time (date, day of the week, etc).

In one evaluation, the sender address of the incoming e-mail message is compared to sender addresses of SPAM messages from the SPAM database. It is common for SPAM messages to include a false sender address. However, the same false address is often repeatedly used. Accordingly, a sender address match increases the likelihood that the incoming e-mail message is SPAM. To efficiently match sender addresses, the SPAM policy database 37 stores an index for the sender fields of records in the database. As may be appreciated, when a message has been delayed, this evaluation is highly effective since any given mass sending of SPAM is likely to include the same sender address, which is then updated in the SPAM policy database 37, by a third party detection that a message is SPAM.

In another evaluation, the e-mail relay 46 determines whether the incoming message recipient or recipient list corresponds to a recipient or a recipient list of a SPAM message. E-mail messages that have only one recipient in the recipient field, while the recipient is not associated with the receiving enterprise, are sometimes indicative of a SPAM messages. When an incoming e-mail message includes such a single recipient, who is foreign to the enterprise, the recipient field of records in the SPAM database is searched. A match of an unknown recipient to an unknown recipient in the SPAM policy database 37 increases the likelihood that the incoming e-mail message is SPAM. A recipient list included in the incoming e-mail message is compared to recipient lists in records of the SPAM database 37. A match of recipient list to a recipient list of a known SPAM message increases the likelihood that the incoming message is SPAM. To efficiently match recipient lists, the recipients lists in SPAM messages are sorted to allow for fast match detection.

In another evaluation, the subject filed of an incoming e-mail is compared to the subject field of records in the SPAM database 37. A match of the subject field of an incoming message with the subject field of a record in the SPAM database 37 increases the likelihood that the incoming e-mail message is SPAM. The SPAM database 37 preferably stores an index based on the subject field to facilitate efficient searching of the records for subject field matches. SPAM messages often include a subject, which has a variable end portion to prevent exact matching by filter programs. Accordingly, in another embodiment, the evaluation discussed above can be further refined to compare only a predefined number of characters from the subject field or provide a comparison result, which is proportional to the number of matching characters from the subject field.

In yet another evaluation, the body of the incoming message is compared to the body of messages in the SPAM database 37. In one embodiment, a hash value is calculated from the incoming e-mail message body. The hash value is compared to hash values computed from body text of messages in the SPAM database 37. A match of the hash value from the incoming message body to the hash value from a record in the SPAM database 37 significantly increases the likelihood that the incoming message is SPAM. In another embodiment, in response to the hash value match, the e-mail relay initiates a more detailed comparison of the incoming e-mail message to SPAM messages in the database 37. In yet another embodiment, the e-mail relay 37 searches for complete sentences and paragraph, which are identified as repeating in SPAM messages. In this embodiment, a Full Text Retrieval database is preferably employed to search for phrases and keywords to provide a match score.

In another evaluation, any Uniform Resource Locator (URL) included in an incoming message is compared to URLs contained records of the SPAM database 37. The URLs can appear in the message body or in a corresponding Hyper Text Markup Language (HTML) tag, for HTML formatted messages. The URLs extracted from incoming messages are searched for in the SPAM database 37. An increased number of URL matches with those stored in the SPAM database 37 increases the likelihood that the incoming e-mail message is SPAM. In another embodiment, the HTML structure is examined for patterns characteristic of SPAM messages such as attempt to conceal the textual content by creative use of HTML tags.

Finally, in a related determination, the identity of the Internet Protocol (IP) address or internet domain from which a SPAM message was received is compared to the IP address or internet domains for the incoming message. The IP address or internet domain of the sending relay is generally not enough on its own to indicate that a message is likely SPAM. However, a match of IP address or internet domain would enhance a finding of likely SPAM by reference to other evaluations.

As may be appreciated, the overall comparison match score, or level, is set by reference to a combination of one or more of the above discussed evaluations. In one embodiment, the overall SPAM likelihood is determined by assigning a weight to each evaluation and combining all weighed scores to arrive at the overall score. In some embodiments, only some of the evaluations are employed. In other embodiments, the evaluations are sequentially applied and are discontinued in response to an accumulated evaluation exceeding a threshold level, as is illustrated in FIG. 3. Thus, other optimization of the comparison score computation can be performed without departing from the teachings of the invention.

FIG. 4 illustrates a method for updating the SPAM policy database 37 for use with an e-mail relay 46 in accordance with the invention. The illustrated method assumes that the end users are trusted to make appropriate determinations in reporting messages as SPAM. The primary source for SPAM policy updates is associated third parties (Step 93). Such third parties include enterprises that have agreed to cooperate with the protected enterprise, a pay-for-update service, a government source, and a free public service.

Another stream for channeling SPAM message attributes to the database is by end users forwarding messages recognized as SPAM to a special e-mail address associated with the e-mail relay. For example, users identifying a message as SPAM will forward the message to spam@enterprise.com (steps 83, 84). In another embodiment, several categories of SPAM are created by providing a plurality of forwarding addresses such as spam-casino@enterprise.com and spam-porn@enterprise.com-. When the e-mail relay receives forwarded messages to the special email addresses, the e-mail relay preferably processes the SPAM messages, as discussed above with reference to the organization of the SPAM policy database 37, to provide SPAM attribute records for comparison to attributes of incoming e-mail messages. In one embodiment, the e-mail messages are optionally quarantined for review by an administrator, when the administrator does not wish to rely solely on the users' characterization of forwarded e-mail messages.

An additional method for channeling SPAM message attributes to the database 37 is by the e-mail relay 46 adding a special URL to incoming messages, which allows users to report the e-mail message as SPAM by selecting the URL. In one embodiment, the URL is unique to the message so as to allow the e-mail relay 46 to identify the message (step 86). The message is preferably stored in the message store of the e-mail relay 38 (step 87). This temporary storage is preferably indexed by an identifier that is included in the URL, which was added to the e-mail message. In one embodiment, the e-mail relay 46 provides an HTTP server to receive URL submissions from users. In response to the HTTP server receiving a URL, (step 88) the e-mail relay 46 retrieves the message from the store 38 by reference to the URL, and adds the message attributes to the SPAM policy database 37 by appropriate processing. In one embodiment, the HTTP server returns an HTTP page to the user to express gratitude for the user's submission of SPAM. In another embodiment, the HTTP server prompts the user for further information about the message before adding the message attributes policy to the SPAM database 37 (step 89). For example, the user may be prompted to classify the SPAM message according to one of several pre-established categories. The e-mail relay 46 updates the SPAM database 37 with the data from the message (step 90). In another embodiment, the URL or portion of URL such as host name or domain name is retrieved from a third party update service.

Incoming messages having a comparison score that is within the threshold range, are processes by interaction with an intended recipient or an administrator. In one embodiment, when an incoming message is determined to be borderline, i.e., not clearly SPAM, the e-mail relay 46 sends a special e-mail message to the intended recipient to indicate that an intended message has been quarantined. The special e-mail message preferably contains a URL for initiating a retrieval session with the HTTP server of the e-mail relay 46. During the retrieval session, the recipient is provided certain information regarding the incoming e-mail, such as sender, subject, and portions of the message body. The recipient is also provided with a form that includes controls to specify whether the message is SPAM. The e-mail relay 46 responds to the user selections to either deliver the message or add the message data to the SPAM policy database 37.

It may be appreciated that a message may be reported as SPAM several times by the same or different recipients. In one embodiment, SPAM database records include a field for a submission count, corresponding to each SPAM message.

The submission count is preferably used as part of the comparison formula to add weight to certain evaluations. For example, when a subject match is for a SPAM attribute record with a high submission count, the subject match result should have an increased weight since the message is very likely to be a repeat of the SPAM message (as were the previous repeat submissions). Accordingly, the system of the invention employs attributes in addition to those inherent in the SPAM message itself to detect incoming SPAM. For example, another external attribute is the time of transmission (day, hour), which can indicate an increased likelihood of a positive comparison for partial matches and other borderline comparisons.

In another embodiment, the first e-mail relay 46 cooperated with the second e-mail relay 36 to share data from the SPAM policy database 37, 45. Accordingly, the first e-mail relay 46 and the second e-mail relay 36 exchange data so as to synchronize the SPAM data stored in each of the local SPAM policy databases 37, 45. As may be appreciated, the exchange of data allows for a recently operational e-mail relay to benefit from the data gathered by another previously operating e-mail relay. The sharing of SPAM data allows for increased detection of SPAM messages such as when the first e-mail relay provides SPAM data to the second e-mail relay prior to the corresponding SPAM messages arriving at the second e-mail relay, thereby allowing the second e-mail relay to intercept the corresponding SPAM messages by employing the shared data. Preferably, the exchange of SPAM data between e-mail relays is part of an agreement between entities to share efforts in preventing the reception of SPAM. In another embodiment, the exchange of SPAM data is by e-mail relays associated with a single organization or set of related organizations, such as affiliated companies.

In an alternate embodiment, the SPAM policy database is a central database, which is shared by several e-mail relays. In one embodiment, each e-mail relay employs a comparison and evaluations, which are configured by the local administrator. In another embodiment, the comparison and evaluations are stored in the central SPAM policy database and are employed by all e-mail relays sharing the database. The SPAM data is preferably provided to the database by the e-mail relays forwarding SPAM messages for processing by the database. In one embodiment, the e-mail relays serve as an intermediary between end users in facilitating the method for collecting SPAM attributes, discussed with reference to FIG. 4. In another embodiment, the e-mail relays perform some preprocessing before providing the SPAM messages to the central database. In one form, such preprocessing is by extracting data from the SPAM message and forming a record that is ready for insertion into the database. As may be appreciated, various other configurations and divisions of labor are possible in facilitating the sharing of a central database by e-mail relays operating in accordance with the invention.

While the present discussion refers to an email filtering relay, it should be clear that the invention is applicable to any system which moves electronic data from source to destination in a store and forward fashion. The nature and content of the electronic data moved is also not essential to the teachings of the invention.

Furthermore, although the present invention was discussed in terms of certain preferred embodiments, the invention is not limited to such embodiments. As may be appreciated, the delayed inspection method of the invention is applicable to a general application of email message policy to incoming or outgoing messages. For example, the present method is applicable to a policy for detecting virus programs in messages and other malicious code. Furthermore, a person of ordinary skill in the art will appreciate that numerous variations and combinations of the features set forth above can be utilized without departing from the present invention as set forth in the claims. Thus, the scope of the invention should not be limited by the preceding description but should be ascertained by reference to claims that follow.

What is claimed is:

1. A method for controlling transmission of messages in a data communication network, the method comprising:
   using a store and forward relay implemented as programmed computer hardware to receive messages intended for respective recipients thereof;
   selecting computer readable formulations of comparisons to apply to the received messages, wherein a selected comparison applied to a message is based on one or more attributes of the message, and a first comparison selected for a first message is different from a second comparison selected for a second message;
   delaying delivery of at least some of the received messages, the delay being based on whether a comparison score associated with a received message is beyond a threshold; and
   after a delay period, applying a filtering policy to the delayed messages and based on one or more results thereof delivering at least one, but not another, of the delayed messages to its intended recipient, wherein the applying of the filtering policy to a delayed message is triggered by a download to the store and forward relay of new executable code to update one or more computer readable formulations of comparisons.

2. The method of claim 1, further comprising:
   Identifying the first comparison for evaluating by reference to the first message;
   identifying at least one evaluation associated with the first comparison;
   for each evaluation associated with the first comparison:
      extracting data from the first message in accordance with parameters associated with the identified evaluation;
      executing the evaluation for the extracted data by comparing the extracted data to data from an unsolicited bulk e-mail database;
      determining a new comparison score based on the executed evaluation; and
      determining that the first message is unsolicited bulk e-mail if the new comparison score is beyond the threshold.

3. The method of claim 1, wherein the relay is configured to take action based on the filtering policy and wherein the action taken includes one or more actions selected from a group consisting of:
   delay delivery of the received message;
   deliver the received message normally;
   return the received message to sender;
   send a copy or blind copy of the received message to an additional recipient;
   forward the received message; and
   delete the received message, and
wherein the delay delivery action, when performed, includes one or more additional actions selected from a group consisting of:
   move the received message to an area for review by an administrator;
   move the received message to an area for future review by an external user;
   move the received message to an area for future review by a recipient;

save a copy of the received message; and
move the received message to a delayed delivery area.

4. The method of claim 1, wherein the filtering policy applied to the first message is different from the first comparison applied to the first message.

5. The method of claim 1, wherein the filtering policy is an updated version of the first comparison applied to the first message.

6. The method of claim 1, further including:
determining whether it is time to process the delayed messages;
when it is determined to be time to process the delayed messages, ending the delay period;
when it is determined to not be the time to process the delayed messages:
waiting for a period of time; and
after the period of time, re-determining whether it is time to process the delayed messages.

7. The method of claim 1, wherein the filtering policy is a subsequent application of the first comparison based on the updated executable code and updated data.

8. The method of claim 1, wherein the first comparison is based on a first set of evaluations and the second comparison is based on a second set of evaluations, and wherein the first set of evaluations is different from the second set of evaluations.

9. The method of claim 1, wherein said relay is an email relay applying e-mail filtering policies to the received messages.

10. The method of claim 1, wherein said relay is acting as an intermediate node for a store and forward email protocol.

11. The method of claim 1, wherein said relay is acting as a final node for a store and forward email protocol.

12. The method of claim 1, wherein the relay comprises components which are distributed across several physical computers but act logically as a single system.

13. An apparatus comprising:
a detention store;
a store and forward relay interposable in a message delivery path and implemented as computer hardware configurable to receive messages intended for respective recipients thereof; and
the relay further configurable to (i) select computer readable formulations of comparisons to apply to the received messages, wherein a selected comparison applied to a message is based on one or more attributes of the message, and a first comparison selected for a first message is different from a second comparison selected for a second message, (ii) delay delivery of at least some of the received messages, wherein the delay is based on whether a comparison score associated with a received message is beyond a threshold, and (iii) after a delay period during which the delayed messages are held in the detention store, apply a filtering policy to the delayed messages and based on one or more results thereof deliver at least one, but not another, of the delayed messages to its intended recipient, wherein the application of the filtering policy to a delayed message is triggered by a download to the store and forward relay of new executable-code to update one or more computer readable formulations of comparisons.

14. The apparatus of claim 13, wherein the relay applies the first comparison to the first message, and wherein application of the first comparison to the first message:
identifying the first comparison for evaluating by reference to the first message;
identifying at least one evaluation associated with the first comparison;
for each evaluation associated with the first comparison:
extracting data from the first message in accordance with parameters associated with the identified evaluation;
executing the evaluation for the extracted data by comparing the extracted data to data from an unsolicited bulk e-mail database;
determining a new comparison score based on the executed evaluation; and
determining that the first message is unsolicited bulk e-mail if the new comparison score is beyond the threshold.

15. The apparatus of claim 13, wherein the relay is configurable to take action based on the filtering policy and wherein the action includes one or more actions selected from a group that includes:
the delivery delay;
delivery of the received message normally;
return of the received message to sender;
sending a copy or blind copy of the received message to an additional recipient; and
deleting the received message.

16. The apparatus of claim 13, wherein the delivery delay, when performed, includes moving the received message to an area for review by an administrator.

17. The apparatus of claim 13, wherein the delivery delay, when performed, includes moving the received message to an area for future review by an external user.

18. The apparatus of claim 13, wherein the delivery delay, when performed, includes moving the received message to an area for future review by a recipient.

19. The apparatus of claim 13, wherein the filtering policy is an updated version of the first comparison applied to the first message.

20. The apparatus of claim 13, wherein the filtering policy is a subsequent application of the first comparison based on the updated executable code and updated data.

* * * * *